United States Patent [19]

Barner et al.

[11] Patent Number: 4,517,623

[45] Date of Patent: May 14, 1985

[54] CONCEALED-FASTENER PANELBOARD FRONT AND CLAMPING LATCHES

[75] Inventors: Gregory P. Barner, Atlanta; Drew S. Hancock, Marietta, both of Ga.

[73] Assignee: Siemens-Allis, Inc., Atlanta, Ga.

[21] Appl. No.: 537,707

[22] Filed: Sep. 30, 1983

[51] Int. Cl.³ .............................................. H02B 1/04
[52] U.S. Cl. .................................... 361/358; 220/3.8; 312/223; 361/356
[58] Field of Search .................. 49/169; 361/356, 357, 361/358, 359–363, 376, 390, 391, 427–429; 312/223, 242, 291, 292; 220/3.8, 354, 355

[56] References Cited
U.S. PATENT DOCUMENTS

| | | | |
|---|---|---|---|
| 3,339,124 | 8/1967 | Jorgensen | 361/356 |
| 3,808,509 | 4/1974 | Frazier | 361/356 |
| 4,131,932 | 12/1978 | Brumfield, Jr. | 220/3.8 |

Primary Examiner—G. P. Tolin
Attorney, Agent, or Firm—F. W. Powers; J. L. James

[57] ABSTRACT

A front panel assembly for an electrical panelboard or the like. An interior trim panel is fastened within the enclosure proper, having holes through which circuit breakers may protrude and having upstanding edge flanges. A panelfront assembly includes a number of rotatable camming latches for engaging the edges of the flanges. The latches are secured in place with threaded screws extending through rabbets which are concealed by the door of the panelfront.

12 Claims, 3 Drawing Figures

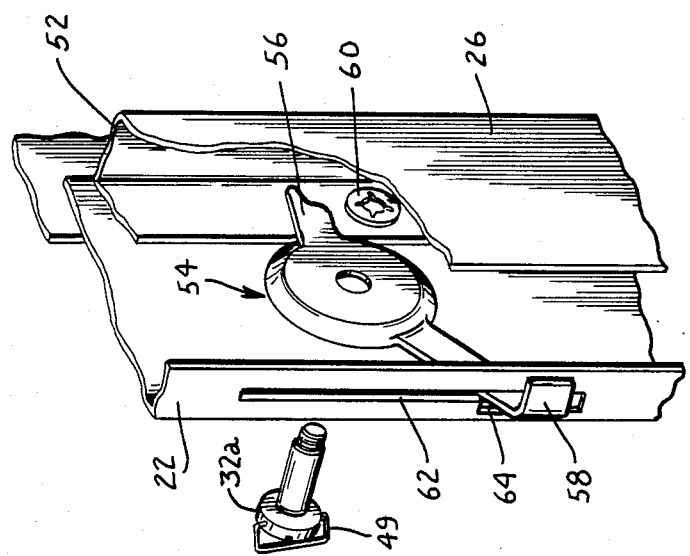
Fig_3
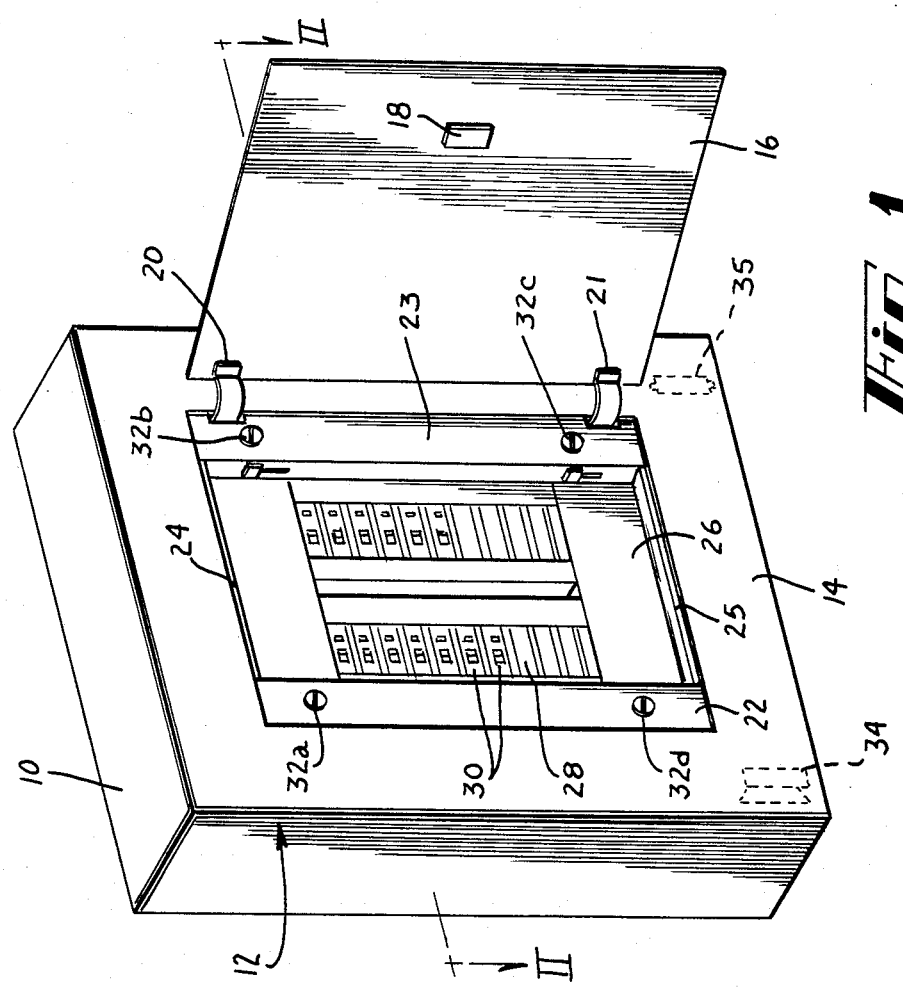
Fig_1

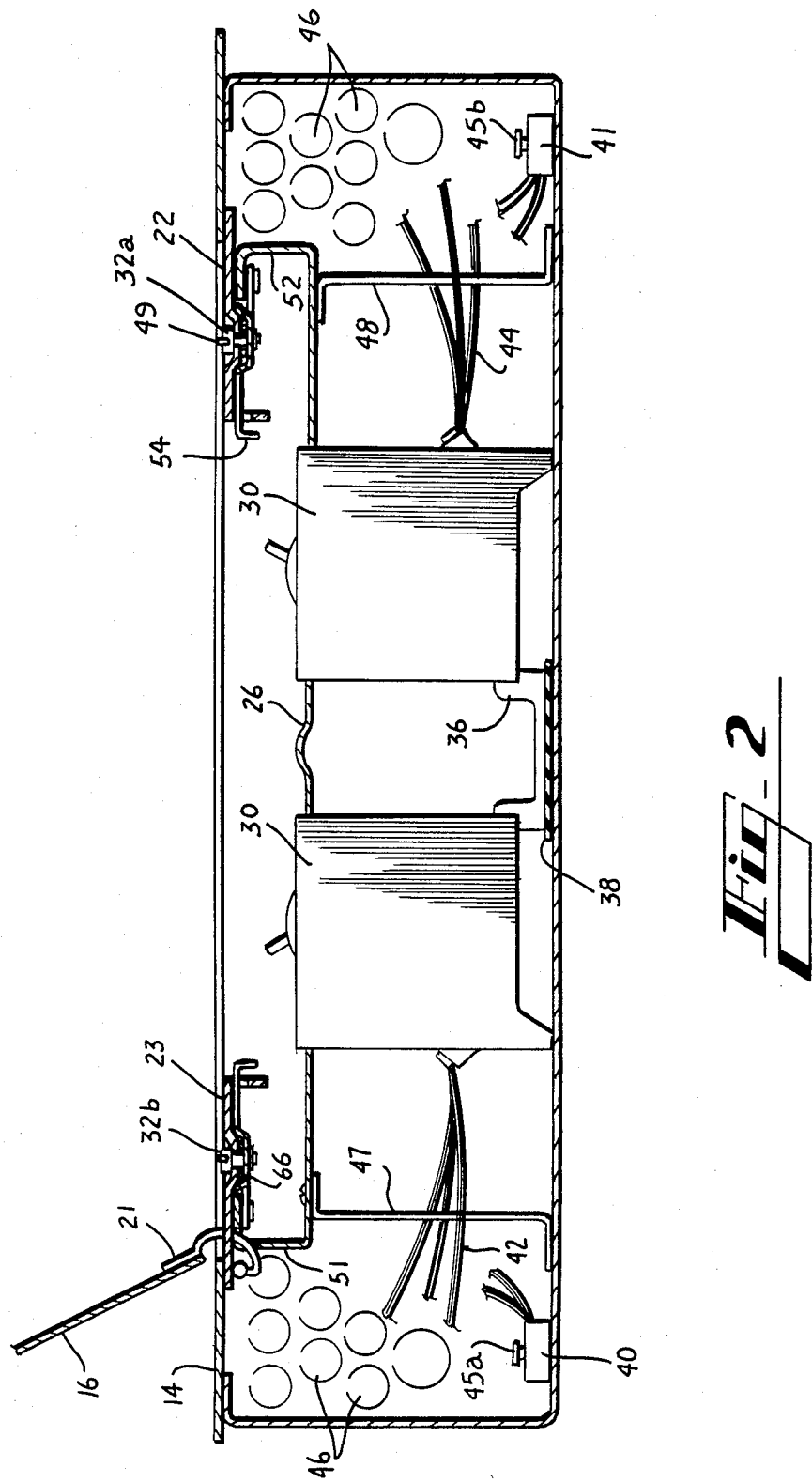

CONCEALED-FASTENER PANELBOARD FRONT AND CLAMPING LATCHES

BACKGROUND OF THE INVENTION

Panelboards are utilized as enclosures for electrical equipment, specifically for electrical circuit breakers. While such enclosures should of course be strong and durable, they must also be economical to manufacture and, for panelboards to be used where they will be visible to others besides technicians and electricians they should present a neat, pleasing appearance.

In recent years it has become more common for architects and builders to prefer panelboards which are free from protruding or even visible hardware and fasteners. Aside from aesthetic considerations—which may be quite important when the panelboard is placed where it can be readily seen, such as a school hallway or a plant cafeteria—safety is often the overriding consideration.

Many panelboards used in the past have utilized front covers (termed "trim panels" in the trade) of a type which is fastened to the underlying enclosure by means of screws or similar fasteners which extend through the exposed surface of the trim panel to engage the enclosure behind it. While this arrangement is structurally acceptable the fact that the fasteners are accessable makes it very difficult to prevent unauthorized persons from removing the panel and gaining access to the interior of the enclosure.

While such an approach is a good one several problems have been observed with such state-of-art panelboards. In some cases, with the door open it is possible to insert a wire or a thin tool into the interior of the enclosure in the vicinity of the "live" electrical parts within it. Moreover many of the clamping arrangements now utilized are awkward to install and are rather elaborate in design, thereby becoming expensive. Still further in the case of most such arrangements the fastening means used to hold the trim panel in place is located within the enclosure wherein "live" electrical parts, e.g. wiring, is located and it is possible for a loose or bent wire to become entangled and/or short circuited by the clamping means. For these reasons it will be understood that it would be highly desirable to provide an improved panelboard which is economical and simple to manufacture and install, but which precludes the penetration of objects into the enclosure and precludes the possibility of entangling the trim panel fastening means in the wiring.

It is therefore an object of the present invention to provide a panelboard having clamping means which will not entangle or short circuit wiring.

Is another object of this invention to provide an improved panelboard assembly which prevents penetration of the inside of its enclosure.

Yet another object is to provide a panelboard with an easily utilized, economical clamping means.

SUMMARY OF THE INVENTION

Briefly stated, in accordance with one aspect of the invention the foregoing objects are achieved by providing a panelboard including a generally rectangular enclosure having an open front with an interior trim panel that, in conventional fashion, has a number of openings therein through which circuit breakers may protrude; and which has opposed edges which extend outwardly toward the front of the enclosure to form a pair of flanges. A front panel is provided which extends at least from the edge of the enclosure to the channel edges, and has a door centrally located which provides access to the circuit breakers. The edges of the front panel which form the door opening are provided with rabbets having indents, upon which are captured rotatable clamps. Each clamp includes a first arm which engages an adjacent flange of the interior panel, and a second arm which can be manually manipulated to rotate the clamp. A threaded fastener is provided to tighten the clamp, thereby drawing the front panel tightly against the front of the enclosure.

In the preferred embodiment the flanges of the interior panel comporise channel sections, and the clamps are formed having a cup-like center section with two generally opposed arms. A threaded hole in the center section engages a clamping screw, and a spring is disposed between the clamping means and adjacent rabbet for ease of installation.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with accompanying drawings in which:

FIG. 1 is a perspective view of a panelboard using principles of the present invention;

FIG. 2 is a cross-section taken along line II—II of FIG. 1; and

FIG. 3 is a detailed illustration of clamping means which forms a part of present invention.

DESCRIPTION OF A PREFERRED EMBODIMENT

FIG. 1 represents an electrical panelboard including a box-like enclosure 10 formed of a back wall (not shown) and four upstanding sidewalls, of which two are visible in the Figure and which terminate in inwardly-turned edges or flanges. The enclosure, like the other elements of the panelboard, is conventionally formed of sheet steel with mating pieces being secured together by means of bolts, clamps and spot welding.

The front of the enclosure is closed by an exterior trim panel assembly generally indicated at 12. This panel comprises a rectangular, generally planar trim ring 14 which extends to the edges of the side walls of enclosure 10. The rectangular opening at the center of the trim ring receives a door 16 which is provided with an appropriate latch 18 and hinges 20,21. When closed, the door seats snugly against a pair of opposed rabbets 22,23 which in a preferred embodiment are formed of sheet steel angles that are spot welded to the rear surface of trim ring 14. In this manner the front surfaces of the rabbets provide convenient stops for the inside surface of door 16; when the door is closed against the rabbets, it is then flush with the front surface of the trim ring.

Rabbet 22 has an appropriate latch member (not visible in the Figure) provided thereon for engaging latch 18. In the preferred embodiment a pair of additional, upper and lower rabbets denominated 24 and 25, respectively are attached to the rear surface of trim ring 14. The latter rabbets are also formed of sheet angle members so that a shallow box-like recess is formed within the door opening.

Recessed between the rabbets is an interior trim panel 26. Although as will be further described herein the trim panel is of special construction the part which is visible in FIG. 1 is conventional, presenting a generally flat surface interrupted by two elongate openings. The openings are occupied by a number of filler covers 28 which may be removed to allow circuit breakers to protrude therethrough. A number of already-installed circuit breakers 30 can be seen protruding through the interior trim panel. Clamping means for securing the front panel assembly comprises a set of clamps which are encaptured on threaded fasteners 32a–32d. Arms of the clamping means can be seen extending through the rabbet surface adjacent fasteners 32b and 32c. Trim supports 34 and 35 are secured to the rear face of trim ring 14. The supports fit between the lateral sidewalls of enclosure 10 to afford lateral location to the panel assembly and are provided with notches at their lower edges to engage the edge of the bottom sidewall of the enclosure. This alows an installer to rest the panelfront on the enclosure's lower edge to support the assembly while it is being secured in place.

Turning now to FIG. 2, there is shown a cross section of the panelboard assembly taken along lines II—II in FIG. 1. The construction of enclosure 10 can be seen, wherein the enclosure has a generally open front, and has disposed within it a bus bar 36 mounted on insulating panel 38. The bus bar is "live", i.e., it is connected to a source of electric power (not shown), the grounded one of the power lines being coupled to neutral busses 40 and 41.

A plurality of circuit breakers 30 of the molded-case type engage tabs upstanding from bus bar 36 which affords a connection to a source of electric power. Wires 42, 44 are coupled to appropriate terminals on the circuit breakers so that when the breakers are closed the wires are coupled therethrough to bus 36. Neutral wires from the various circuits are coupled to the neutral bus bars 40, 41 by inserting them into holes in the bus bars and clamping with set screws 45a and 45b to hold them in place. A number of other wires running to other circuit breakers or connected to a neutural bus are generally represented at 46 and extend behind the exterior trim panel, in an arm generally described as a wire trough.

Interior trim panel 26 extends across the open front of the enclosure, generally centrally thereof, and serves to cover the area about the circuit breakers. As is well known, the interior panel is provided with panels which can be removed to allow the circuit breakers to extend therethrough, as shown in the Figure. The interior panel may be supported in any convenient means, such as by way of upstanding supports 47, 48 which are attached to the interior panel and to the rear panel of enclosure 10 by means of appropriate fasteners.

The exterior trim ring 14 in combination with rabbets 23, 24 spans the distance between the edge of enclosure 10 and the flanges 51, 52 formed at the edges of interior trim panel 26. The L-shaped cross section of the rabbets is clearly shown in the figure, as is their attachment to the rear surface of trim ring 14 at opposite sides of the door opening. As shown, the rabbets extend toward one another past the flanges of the interior panel so that the clamps are disposed between the upstanding flanges 51 and 52 of the interior panel. In the preferred embodiment flanges 51 and 52 take the form of C-shaped channels which stand up from the interior panel and open toward one another so that the outer edges of each channel can be engaged by the clamping means.

The rabbets, and therefore the front panel assembly, are held in place by clamping to the outer edges of the channels 51, 52 formed at the edges of interior trim panel 26. This is effected by a number of clamps, one of which is indicated at 54. Inasmuch as it is contemplated that all clamps will be identical only one will be described, it being understood that the other clamps are identical in form and function.

Clamp 54 comprises a metal element having a generally cup-shaped center and a pair of opposed arms. One of the arms extends under the outer edge of channel 52, while the other extends through the adjacent edge of rabbet 22. The center of the cup-shaped portion is provided with a threaded hole, which receives fastener 32a. A coil spring is disposed between the rabbet and the clamp, as will be further described. A dimple-like recess 66 in the rabbett for receiving the head of fastener 32a so that a substantially flush surface is presented to the surface of door 16. The recess further provides location for the clamp 54 as it is advantageously of a size to mate with the recessed center of the clamp. In a presently preferred embodiment a bail 49 made of steel wire is snapped into recesses at opposite sides of the fastener head. This provides a convenient handle which can be grasped by an installer to turn the fastener. The bail can then be folded flat about the head of the fastener to present a generally flat surface to the inside of door 16.

FIG. 3 is a cutaway view of the rear side of rabbet 22 as seen from within the panelboard enclosure. It will be seen that clamp 54 comprehends a central cup-like section with a first arm 56, preferably having an upturned edge, extending from one side thereof and another arm 58 generally opposite the first arm. Arm 58 is advantageously provided with a bent end which may be manually grasped to pivot the clamp about and which serves as a stop to limit rotation of the clamp. The shank of threaded fastener 32a is seen extending through the center of the clamp 54, as is a push nut 60 which is snapped into a groove in the end of the fastener so that it cannot be unscrewed from the clamp.

In order to install the panel front assembly on the enclosure threaded fasteners 32a–32d are unscrewed, the coil spring between the rabbet and clamp serving to push the clamp away from rabbet as it is unscrewed. The coil spring is preferably conical so that it collapses to a flat coil when compressed. Arm 58 is rotated to turn the clamp to a position where arm 56 will clear the edge of the adjacent interior panel channel. In FIG. 3, this corresponds to raising arm 58 to the upper end of slot 62, whereby arm 56 will be rotated downwardly to a point where it clears the edge of channel 52. Due to the force of the biasing spring, the clamp will stay in this position as the front of the panelboard assembly is put into place.

To secure the panelfront assembly in place, the clamps are rotated by rotating arms 58 to cause arms 56 to engage channels 52. The inclined, leading edge of arm 56 facilitates this, providing a camming surface to allow arm 56 to more easily ride over the channel edge. With the clamping means then turned to the position shown in FIG. 3, fastener 32a, is turned draw clamp 54 toward the back surface of rabbet 22 so that the edge of channel 52 is tightly gripped between arm 56 of the clamp and the back surface of the rabbet.

In the presently preferred embodiment slot 62 is narrowed above the point where arm 58 rests when the clamp is tightened. Owing to friction between the threaded fastener and clamp 54 as the fastener is turned the clamp will rotate until arm 58 reaches the lower end of the slot. Further tightening of the fastener draws the clamp back against the rabbet, and the lower end of the slot is widened to allow this to occur. When in this position arm 58 cannot be raised, as it is blocked by the shoulder 64 of the narrowed portion of the slot.

In order to loosen the clamps fastener 32a is unscrewed. Arm 58 initially abuts the shoulder of the narrowed slot portion but after the fastener has made a few revolutions the spring between the rabbet and the clamp forces the clamp back so that arm 58 aligns with the narrowed slot portion. The friction between the clamp and the fastener then causes the clamp to rotate along with the fastener, riding up within slot 62 until it reaches the upper end of the slot. The rotation of the fastener at this point is sufficient to have turned arm 56 clear of the lip of channel-like flange 52 so that the trim panel can be removed.

Returning to FIG. 2, it will now be apparent that once the outer trim panel assembly is tightly clamped to the flanged edges of interior panel 26 there will be no gap between the two, so that it will be impossible for a screwdriver, knife blade or the like to be inserted between the interior panel 26 and door rabbets, and penetrate into the wiring trough areas above bus bars 40, 41 wherein live wires extend vertically within the enclosure. This provides an additional safety factor in the use of the panelboards. Still further, unlike prior art designs the side areas, or wire troughs, at either side of the enclosure are not invaded by the clamping means.

It will be seen that other means besides an outer edge of the channel-like flange may be used for engaging arm 56 of each clamp. For example, the outer edge of the flange could be removed and a small slot or ledge formed in the upstanding part of the flange for engaging arm 56. As the clamp itself is removed from the wire trough area, the liklihood of entanglement or damage to the wire is still minimized. With the preferred embodiment, however, flanges 51, 52 effectively serve as barriers between the wire trough areas and the clamping means. In prior art designs in which the clamping devices are not so isolated and extend into the wire trough area, a poorly located wire may be entangled in a clamp or other fastener; or pinched against a portion of the panel enclosure and short circuited. With the present invention, however, the wire trough areas are effectively isolated by the channel-like edges about interior panel 26 so that the wiring is not susceptible of damage or short circuiting by the clamping means.

It will now be seen that the present invention provides an improved panelboard assembly including clamping means which are concealed from view and secured from tampering when the door is shut, and which moreover provides a mounting system for the front panel thereof which guards against injury of wires within the panel and provides an effective barrier to prevent penetration of the area wherein such wires extend. It will be evident from the foregoing description that certain aspects of the invention are not limited to the particular details of the examples illustrated, and it is therefore contemplated that other modifications or applications will occur to those skilled in the art. It is accordingly intended that the appended claims cover all such modifications and applications as do not depart from the true spirit and scope of the invention.

What is claimed as new and desired to be secured by Letters Patent of the United States is:

1. In a panelboard including a generally rectangular enclosure having a back portion and side portions terminating in flanges defining an open front of said enclosure and having bus means disposed therein for connection to a plurality of circuit breakers,
   an interior panel disposed within said enclosure and defining openings through which portions of the circuit breakers may protrude;
   mounting means fixedly securing said interior panel within said enclosure generally parallel to the open front thereof;
   said interior panel terminating in generally C-shaped channels at opposite edges thereof, said channels extending outwardly from the central section and including means for engaging a clamp;
   a front cover for the enclosure including a generally rectangular trim plate having an outer periphery extending at least to the side portions of the enclosure; an opening disposed generally in the center of said trim plate; a door fitting into said opening; rabbets disposed at opposite sides of the opening and extending toward one another past the channels of said interior panel; and clamp means rotatably attached to the rear sides of said rabbets to lie between said channels, said clamp means having arms engaging said channels for drawing said front cover against the enclosure.

2. The invention defined in claim 1, wherein said clamp means comprise a body having a generally circular center section and first and second opposed arms extending therefrom, the first of said arms extending past an edge of the rabbet associated therewith, whereby said first arm may be manually manipulated to rotate said clamp member to move said first arm from a first position in which the second arm does not engage said flange to a second position in which said second arm engages said flange.

3. The invention defined in claim 2, further including a screw extending through said rabbet and threadedly engaging said center section of said clamp means for drawing said clamp means toward said rabbet.

4. The invention defined in claim 3, wherein said flanges turn toward one another to form mutually opposed channels having outer edges generally parallel to said interior panel, whereby said second arm of said clamp member engages the outer edge of one of the flanges.

5. The invention defined in claim 4, wherein said rabbet is provided with a depression, said screw extending through said depression, whereby the head of the screw is seated within the depression of the rabbet and said circular center section is located generally concentrically with said depression.

6. The invention defined in claim 5, further including spring means disposed between the rear surface of said rabbet and said circular center section of said clamp means for biasing said clamp means away from said rabbet.

7. The invention defined in claim 6, further including a bail pivotally attached to the head of said screw.

8. The invention defined in claim 2, wherein said rabbets each include an edge member extending generally at right angles to the front cover and defining a slot adjacent said clamp means for receiving said first arm, said slot having a wider portion for receiving said first arm when said first arm is in said second position.

9. A panelboard assembly including a generally rectangular enclosure having a back portion and side portions terminating in, a inwardly-turned, generally rectangular channels, bus means disposed within said enclosure for receiving a plurality of circuit breakers therein, an interior panel fixedly disposed within said enclosure and having openings through which portions of said circuit breakers may extend, the edges of said interior panel terminating in generally C-shaped channels upstanding therefrom; a front cover extending at least from the flanges to the channels, said cover having an opening therein and a door fitting flush in the opening, rabbets extending adjacent said opening and overlapping said channels; and clamping means disposed behind said rabbet and comprising a plurality of rotatable clamps each having an arm removably engaging a portion of a channel.

10. The invention defined in claim 9, wherein said clamping means comprises a generally cup-shaped center section and a pair of generally opposed arms extending therefrom, one of said arms extending into said channel and the other arm extending past the edge of said rabbet whereby said second arm may be manually grasped when said door is open.

11. The invention defined in claim 10, wherein said rabbetts are provided with inwardly-turned, confronting edges, said edges having slots therein for receiving one arm of said clamping means.

12. The invention defined in claim 11, wherein said rabbetts are provided with depressions, and threaded screws extending through said depressions and threadedly engaging said clamping means.

* * * * *